(12) United States Patent
Bennett (10) Patent No.: US 8,913,865 B1
(45) Date of Patent: Dec. 16, 2014

(54) WAVEGUIDE INCLUDING LIGHT TURNING GAPS

(71) Applicant: Microsoft Corporation, Redmond, WA (US)

(72) Inventor: John Grant Bennett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/929,759

(22) Filed: Jun. 27, 2013

(51) Int. Cl.
*G02B 6/10* (2006.01)
(52) U.S. Cl.
CPC .......................................... *G02B 6/10* (2013.01)
USPC ............................ 385/129; 385/130; 385/131
(58) Field of Classification Search
CPC ...... B82Y 20/00; G02B 6/1225; G02B 6/132; G02F 2202/32
USPC ................................................. 385/129–132
See application file for complete search history.

(56) References Cited

U.S. PATENT DOCUMENTS

| | | | |
|---|---|---|---|
| 5,544,268 A | 8/1996 | Bischel et al. | |
| 6,266,473 B1 | 7/2001 | Saccomanno et al. | |
| 7,496,263 B2 | 2/2009 | Xie et al. | |
| 7,664,357 B2 * | 2/2010 | Song et al. | 385/129 |
| 2005/0286266 A1 | 12/2005 | Park | |
| 2010/0321409 A1 | 12/2010 | Komori et al. | |
| 2011/0242670 A1 | 10/2011 | Simmonds | |
| 2012/0162549 A1 | 6/2012 | Gao et al. | |
| 2012/0218301 A1 | 8/2012 | Miller | |

FOREIGN PATENT DOCUMENTS

| | | |
|---|---|---|
| JP | H05158036 A | 6/1993 |
| WO | 2010/141267 A1 | 12/2010 |

OTHER PUBLICATIONS

Inoguchi, et al., "The Development of a High-Resolution HMD with a Wide FOV Using the Shuttle Optical System.", In Proceedings of SPIE, vol. 6955: Head- and Helmet-Mounted Displays XIII: Design and Applications., Mar. 17, 2008, 8 pages.
"International Search Report & Written Opinion for PCT Patent Application No. PCT/US2014/043102", Mailed Date: Oct. 7, 2014, 10 pages.
English Abstract of JPH05158036 published Jun. 25, 1993, 2 pages.

* cited by examiner

*Primary Examiner* — Ellen Kim
(74) *Attorney, Agent, or Firm* — Micah Goldsmith; Judy Yee; Micky Minhas (57) ABSTRACT

The technology provides embodiments for a waveguide including gaps which turn the direction of light. Each of a plurality of planes located within a waveguide includes a group of gaps so that each of the gapped planes partially reflects out of the waveguide light within a first angle range and transmits down the waveguide light received within a second angle range. In some examples, the waveguide is formed by joining optically transparent sections, and each group of gaps is formed in a surface of each optically transparent section which becomes a joining surface when bonded with an abutting all flat surface of an adjacent section. The waveguide may be used in displays, and in particular in near-eye displays (NED)s.

20 Claims, 5 Drawing Sheets

WAVEGUIDE INCLUDING LIGHT TURNING GAPS

BACKGROUND

Waveguides can be used in displays, in a variety of sizes, for example for televisions to near-eye displays (NED)s. A typical example of a near-eye display is a head mounted display (HMD). In particular, a kind of waveguide uses internal mirrors to turn a fraction of the light at multiple positions in the waveguide. Multi-layer dichroic mirrors have been used. The mirrors are tuned to be partial reflectors. However, manufacturing a waveguide which such dichroic mirrors is difficult to manufacture due to the use of precise multiple optical coatings to create the mirror. Dichroic mirrors are fragile, limited in the range of angles they can handle, and limited from use in larger sizes by mechanical strength. Durable, quality waveguides which can be made for consumer driven prices are desired.

SUMMARY

The technology provides embodiments for a waveguide made up of an optically transparent material having gaps in the material at points along the length of the waveguide which gaps turn the direction of light. For examples, the gaps act as reflectors. The waveguide may include a number of planes at locations along the waveguide. Each plane includes gaps which occupy a fraction of the area of the plane. Each gapped plane can simultaneously be a partial reflector causing light in a first range of angles to exit the waveguide while also being a transmitter of light in a second range of angles down the waveguide. The light in the first range of angles The waveguide may be used in displays. Some examples of displays are near-eye displays (NED)s, large displays intended for telepresence or window or heads-up displays.

The technology provides one or more embodiments of a waveguide using gaps for turning light. An embodiment of the waveguide using gaps for turning light comprises planar surfaces extending a length of the waveguide including a top planar surface. A plurality of gapped planes are located within the waveguide surrounded by the planar surfaces, and each gapped plane meeting the top planar surface tilted at a same angle. Each gapped plane includes a group of gaps occupying a fraction of the area of the plane. Each of the gapped planes partially reflects out of the waveguide light received within a first angle range and transmits down the waveguide light received within a second angle range.

The technology provides one or more embodiments of a method for making a waveguide using gaps for turning light. An embodiment of a method for making a waveguide using gaps for turning light comprises forming a pseudo-randomized pattern of pits in one surface of each of a number N of optically transparent flat sections. The pattern may appear random but in practice is likely to be carefully calculated in avoid repetitious features which would create visible artifacts like ripples or spots of varying brightness. The embodiment of the method further comprises tilting the pitted N optically transparent flat sections at a same angle with each of the pitted N surfaces facing in the same direction, and stacking the tilted pitted N optically transparent flat sections into a stack with each of the pitted N surfaces facing in the same direction so each pitted surface abuts an all flat surface of a respective adjacent optically transparent flat section. The embodiment of the method further comprises bonding the stack of N sections by bonding flat non-pitted portions of each of the pitted N surfaces to the all flat surface of the respective adjacent optical transparent flat section for forming a gap in each of the pits, slicing across the stack to form a waveguide including the N bonded sections tilted at the same angle; and polishing external planar surfaces of the slice waveguide for satisfying total internal reflection (TIR) flatness criteria.

The technology provides one or more embodiments of an optically transparent waveguide. An embodiment of the optically transparent waveguide comprises planar surfaces including a top planar surface and a bottom planar surface and joining surfaces. Each joining surface has flat surface areas and a number of gaps, and each joining surface extends from the top planar surface to the bottom planar surface and is tilted at a same angle with respect to the top planar surface.

Each gap of each joining surface reflects out of the waveguide light received by the gap within a first angle range, and each gap of each joining surface passes for total internal reflection down the waveguide light received within a second angle range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

As noted above, the technology provides embodiments for a waveguide made up of an optically transparent material having gaps in the material at points along the length of the waveguide which gaps turn the direction of light. The gaps may be vacuum filled in some examples, air filled in other examples, and gas filled in yet other examples. Thus, the gaps act as mirrors. A group of gaps may be surrounded by flat material in a plane, and these gapped planes are located along the waveguide for providing different fractional turning of light out of the waveguide at the locations. The percentage of planar area occupied by the gaps determines the fraction of light reflected out. Whether light is partially reflected out of the waveguide by a gapped plane at a location or transmitted depends on the angle at which light approaches the gapped plane. Each of the gapped planes can simultaneously partially reflect out of the waveguide light from a planar surface received within a first angle range and transmit down the waveguide light from a planar surface received within a second angle range.

As discussed below, in some embodiments, the waveguide may be made up of sections, e.g. optical flats, of optically transparent material, for example an optically transparent plastic or other typical waveguide material. Before being joined together, one flat joining surface of each section is pitted, and the pitted joining surface is the same joining surface for each section. The pattern of pits and percentage of pits to flat surface area on the joining surfaces may be varied for each optical section to allow for different fractional turning of light along the resulting waveguide. The sections with their pitted joining surfaces are tilted at an angle allowing for total internal reflection for light received in one angle range by a pitted joining surface and passing with minimal loss light received in another angle range. The sections are then stacked and bonded so that an all flat surface of one section abuts a pitted joining surface. The flat surface areas of the pitted joining surface are bond or fused with the all flat abutting surface. The bonded abutted flat surface and each pit form a gap. A waveguide made up of the tilted sections bonded at the joining surfaces is sliced from the stack and polished.

This technology allows for not using optical coatings, allowing simpler manufacture, the use of durable materials, and a wider range of angles. The thin gaps covering a fraction of the joining surface can act as total internal reflection (TIR) mirrors. The TIR effect precisely covers a wider range of angles than coated dichroic mirrors, inherently almost all the angles that the waveguide itself can use, while controlling the surface pattern allows fine control of the relative proportions of transmission and reflection. Using gaps to make a mirror surface is compatible with direct material fusion which eliminates surface discontinuity or weakness.

Figure 1:
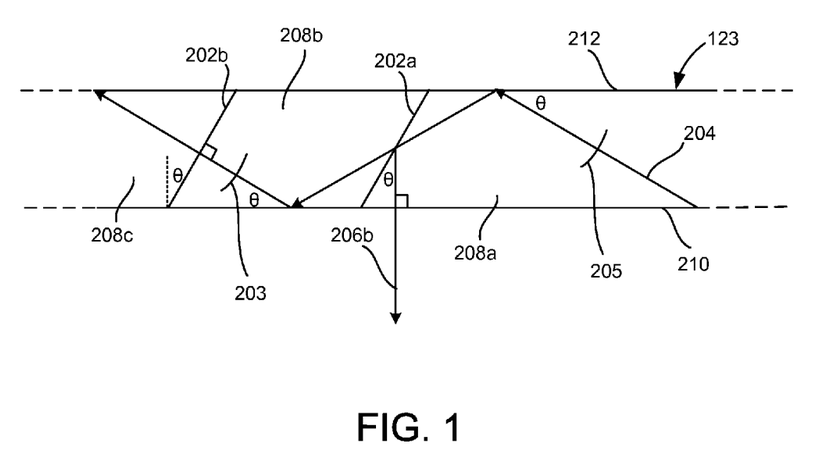
FIG. 1 is a block diagram of an embodiment of a waveguide using gaps for turning light.

FIG. 1 is a block diagram of an embodiment of a waveguide 123 using gaps for turning light. A representative portion of the waveguide is illustrated. As indicated by the dashed lines extending from planar surfaces 210 and 212, the waveguide continues in both directions. Light illustrated by representative center ray 204 such as image light from an image generation unit of a display system is coupled into waveguide 123, for example by an input window (not shown). Light fills the waveguide, bouncing off bottom and top sides, so there are many ray paths which could be illustrated. Any given ray will approach some joining surfaces sloping down, as illustrated for the ray passing thru joining surface 202a, and some joining surfaces passing up, as illustrated for the ray passing thru joining surface 202b. At any given time, every joining surface has rays originating from the image which may be arriving from the upper surface or the lower surface of the waveguide at a variety of angles. So, every joining surface is typically handling half of its light on paths from the top, while at the same time half of the light is on paths reflecting from below. For illustrative purposes, processing of one exemplary light ray 204 is shown.

Representative waveguide sections of optically transparent material 208a and 208b are bonded at pitted joining surface 202a, and optically transparent material sections 208b and 208c are bonded at pitted joining surface 202b. (Illustrations of pitted surfaces are discussed below.) Some examples of optically transparent material are glass, plastic and quartz. Each of the joining surfaces 202a and 202b are in a respective plane which meets the top planar surface and is tilted at a same angle. Illustrated are two planar surfaces 210 and 212 which extend the length of the waveguide and are formed by polishing the exterior surfaces of the waveguide formed from the sections. The waveguide would have at least two more planar surfaces which reflect light, for example in a rectangular shaped waveguide. The number of planar surfaces may vary in other waveguide configurations. In this embodiment, pitted joining surface 202a reflects for exit from the waveguide light of representative ray 204 received in a first range of angles, while pitted joining surface 202b passes along the waveguide light from a planar surface received in a second angle range. These angle ranges are the result of alternate total internal reflections from the planar surfaces of the waveguide.

In this example, the first angle range 205 is centered about an angle θ, which is the tilt angle formed by each pitted joining surface with a normal plane which intersects planar surfaces 212 and 210. A normal plane is a perpendicular plane. Thirty (30) degrees from the normal is a preferred tilt angle as light at that angle will be perpendicular both when emerging and when passing through the gaps when the gaps have a quarter wavelength thickness. The first angle range 205 for partial reflection includes angles with an angle deviation about angle θ. The angle deviation is determined in part based on the optically transparent material used. Materials with a greater refractive index allow a slightly wider angle deviation. For example, glass or plastic with a refractive index of 1.7 may allow an angle deviation of plus or minus 24 degrees about angle θ. (For angle θ of 30 degrees, the first angle range would be about from 6 to 54 degrees.) For a glass or plastic material with a refractive index of 1.5, the angle deviation may be plus or minus 20 degrees about angle θ. The second angle range 203 in which light received from a planar surface will be passed through for total internal reflection down the waveguide is 90 degrees relative to the joining surface plus or minus the same angle deviation. So the center angles in the range differ, but the size of each of the first and second angle ranges is the same due to the same angle deviation being used.

In this embodiment, image light within an angle range of about 54 degrees to 60 degrees centered about angle θ formed between pitted joining surface 202a and planar surface 212 is in the first angle range 205 and will be reflected by pitted joining surface 202a as indicated by central exit ray 206b, which is coming out of the page. Pitted joining surface 202b passes through light received from planar surface 210 in the second angle range centered about 90 degrees Before discussing patterns of gaps, on each surface, a few properties of the gaps themselves are discussed. The sides of each gap sharing the tilt angle with the joining surface are parallel. For example, if the side formed by the abutting flat surface is called a front side of the gap, the back side formed by the pitting process is parallel with the front side. Preferably, the back side and the front side separation is a quarter wavelength. As discussed below, the edges or boundaries of the gap may take different shapes.

The thickness or separation between the front side and the back side of the gap may be a quarter wavelength in many examples due to its anti-reflective property. A gap from glass or plastic to air or vacuum or a gas or other gap filler turns the direction of light, e.g. creates reflection or diffraction. Reflection is used in this example. There is partial reflection of the light coming into the gap and partial reflection of the light coming out of the gap. With glass, each of those partial (Fresnel) reflections are on the order of 5%. That would eventually add up, and cause again stray light, unwanted light, going backwards in the wrong direction. However, at a quarter wavelength thickness of the gap, the entry and exit reflections cancel each other out which suppresses the reverse reflection. Thus, a quarter wavelength separation or thickness provides a good antireflective property. Other wavelengths at multiples of half a wavelength from the quarter wavelength like ¾ wavelength, and 1 and a quarter also have this property.

Because of this property, unwanted Fresnel reflection is reduced, although some Fresnel reflection can be tolerated.

The thin quarter wavelength gap does mean that the TIR ratio will be less than 100% since some energy passes through the gap via an evanescent wave. Losses from 17% to 30% may result, dependent upon color and angle of incidence. However, the reduction is not problematic as the gaps are being used for partial reflection.

The use of gaps at a quarter wavelength in a small fraction of area of the joining surface is also very beneficial for transmissive surface crossings, e.g. as illustrated at 202b. For example, for a pitted joining surface of 90% or so being flat and clear, and 10% of the surface 202b being pitted to include the gaps, the pitted part of the surface transmits >95% of light due to the antireflective quarter wave, which means less than 3% of 5% light is reflected, <0.5%. That loss ratio is low enough to allow many transmissive crossings.

The quarter wavelength may be set based on a bandwidth for a color of the coupled image light. For example, the quarter wavelength may be set for the color green, to which the eye is most sensitive. It's also not that bad as a quarter wave cancellation for blue and for red. Three quarter wavelength or 1 and ¼, will result in a more aggressive change across the spectrum; some places it will reflect more, some places it will reflect less. The quarter wavelength actually used may be chosen for getting a compromise across the whole spectrum, of getting cancellation of the reflection. For green, reflection cancellation will be near complete because the quarter wavelength is set for it.

Thicker gaps like ¾ and 1 and ¼ could be used, eliminating evanescence but increasing reverse reflections at the transmissive pitted joining surfaces. This tradeoff might be preferred in some devices.

If the variation in transmission by color is a problem, fortunately, it is a gradual variation by color and by angle and so the net result is a predictable variation over the resulting image. This can be compensated for by use of gradation in the source illumination and compensating multipliers of pixel intensity by an image source providing the image light.

Each of the gapped planes like the joining surfaces along the length of the waveguide implements partial reflection. Otherwise, the light will not travel down the waveguide past the first few mirrors, even when considering transmission due to the evanescent wave. In order to travel through many gapped planes or joining surfaces, e.g. 40 surfaces in a waveguide in a near-eye display (NED), only a fraction of the plane of joining surface has gaps. As discussed for embodiments below, a joining surface is pitted to make gaps. The percentage of a joining surface like 202a that is pitted in some examples may be roughly the inverse of the number of joining surfaces which will partially reflect light received within a first angle range out of the waveguide prior to reaching a gapped plane or pitted joining surface. The entry angle at which light for display is coupled into a waveguide is predetermined, and the path for light of that entry angle through the gapped planes or joining surfaces can be predetermined, so the number of partial reflections which have occurred at each location along the waveguide can be reliably identified from design parameters.

Increasing the fraction of gaps to flat surface keeps the reflection intensity near constant as light for display progresses and reflects further along the waveguide. In some examples, the fraction of pitted areas will change slowly until the last few mirrors. For example, if 20 pitted joining surfaces were to be used with ten partially reflecting at every other joining surface for light coupled at the entry angle, then the percentage coverage by the gaps on a first partially reflecting pitted joining surface may be about ¹⁄₁₀, or 10%. The coverage ratio increases as there are fewer remaining surfaces, so the next partially reflecting pitted surface has ⅑ coverage, then the next such surface has ⅛ or 12.5% coverage, and so on until the last surface acting as a partial reflector which may actually be a 100% mirror. The last reflective surface may be pitted for 100% reflection or it may be made of other material. For example, it may be an aluminized mirror. In many embodiments, the overall planar area of each gapped plane or surface area of each joining surface is about the same.

These ratios are approximate, and actual products may use slightly different ratios as determined by detailed numerical simulations and actual measurements, to adjust for other factors in the system such as evanescence and waveguide losses. For external light passing vertically the waveguide will seem almost clear since such light encounters only one fractional reflection. External light which is reflected will mostly exit on a parallel path at neighboring joining surfaces. This combination of small fraction and parallel continuation should minimize loss or blur of external light.

Figure 2A:
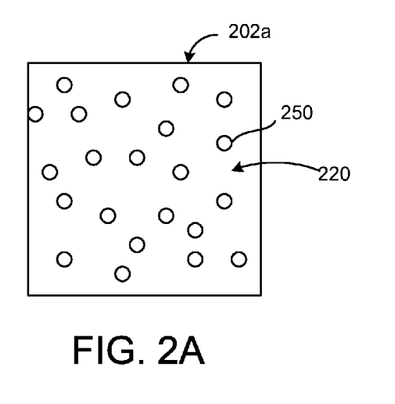
FIGS. 2A and 2B are block diagrams illustrating examples of pit or gap patterns which vary in pattern and percentage of surface coverage.
Figure 2B:
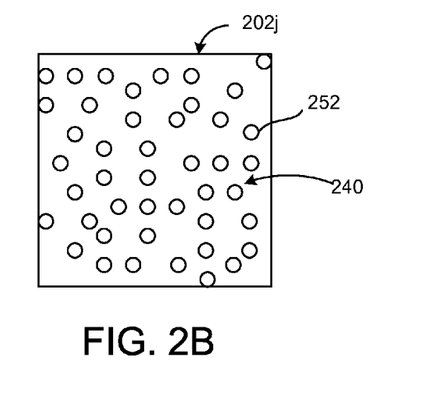

FIGS. 2A and 2B are block diagrams illustrating examples of pit patterns which vary in pattern and percentage of surface coverage. FIG. 2A is an example of a pseudo-randomized pit pattern 220 using pits or gaps 250 each with a circular boundary indicating the edges of each gap. The pits or gaps occupy about 10% of the surface area of the pitted joining surface, in this example partially reflective pitted joining surface 202a. Just one gap is labeled to avoid overcrowding the drawing. In FIG. 2B, the pits 252 in this pseudo-randomized pattern 240 also have circular boundaries. About ⅕ or 20% of the surface of joining surface 202j is pitted or gapped. Some examples of other boundary shapes of each pit include square or annular. The edges or boundaries of the pits are a source of diffraction, and diffraction creates stray light which degrades the image. A circle has the lowest ratio of boundary to area.

The pits are to be wide enough to be effective as classic mirrors, and not be strongly diffractive. In some examples, a pit is at least 30 microns across. For a 5% reflection ratio, this implies there is on average one pit per 110 microns linear separation. It may be possible to go even larger. The tradeoff in size of pits is controlling stray light from diffraction while avoiding visible structure.

For a display, it is desirable that the view received by a pupil of a viewer's eye originate from several of the pits so the eye receives a fairly uniform amount of light coming from an apparently infinite image. In the context of a display like a television which a user views from at least a few feet or so, the pits or gaps can be relatively large, for example, they might be like a millimeter or so. However, in a near-eye display where they're about a centimeter from a viewer's eye, the pits are to be small enough in size so that the viewer's pupil encompasses several of these pits. As the viewer's eye moves around, the eye will pass out of the region of a beam coming from one pit, and start picking up the light beam from another pit. The number of pits are determined based on making that experience fairly uniform, so that no matter which direction the viewer is looking at, the viewer sees an average selection of pits. Taking the pupil of the human eye to be about 2000 microns, a pit size about 30 microns to 200 microns across the joining surface with about 110 micron separation from the next gap or pit on the surface will work for a near-eye display.

Pit patterns 220 and 240 are deliberately pseudo-randomized and deliberately made to have different pseudo-random patterns from each other. The pattern of pits is a source of diffraction. For example, a regular pattern creates regular diffraction which may create things like rainbows and images at unwanted angles. Patterns may also be designed to ensure that adjacent pitted surfaces have minimal and pattern-free interactions with each other due to the systematic occlusion of transmitted or reflected light from nearby surfaces.

Some blurring of the wavefront may occur due to phase shift in the fraction of light passing by evanescent wave, which may impress a ripple on the wavefront which keeps the pattern of the pit boundary shape. However, this blurring may have a worst case effect of 0.5% of the light per reflective incident, varying by angle and color. The image will, however, be preserved since all pits will produce similar phase shift. Thus, a subtle change in colors and brightness from one side of the waveguide to the other is predicted to be created. However, humans will not notice the changes in color and brightness unless they are at the center of view, e.g. along the optical axis of a display. Therefore, the change may be measured to identify its effect when looking at the part of the waveguide in the direction of the part of the image being computed. A correction may be applied to a source pixel which should balance the changes for that zone. The shift occurs gradually so the correction does not need to be exact. The corrections can be measured in a lab and then copied into all display systems.

Figure 3A:
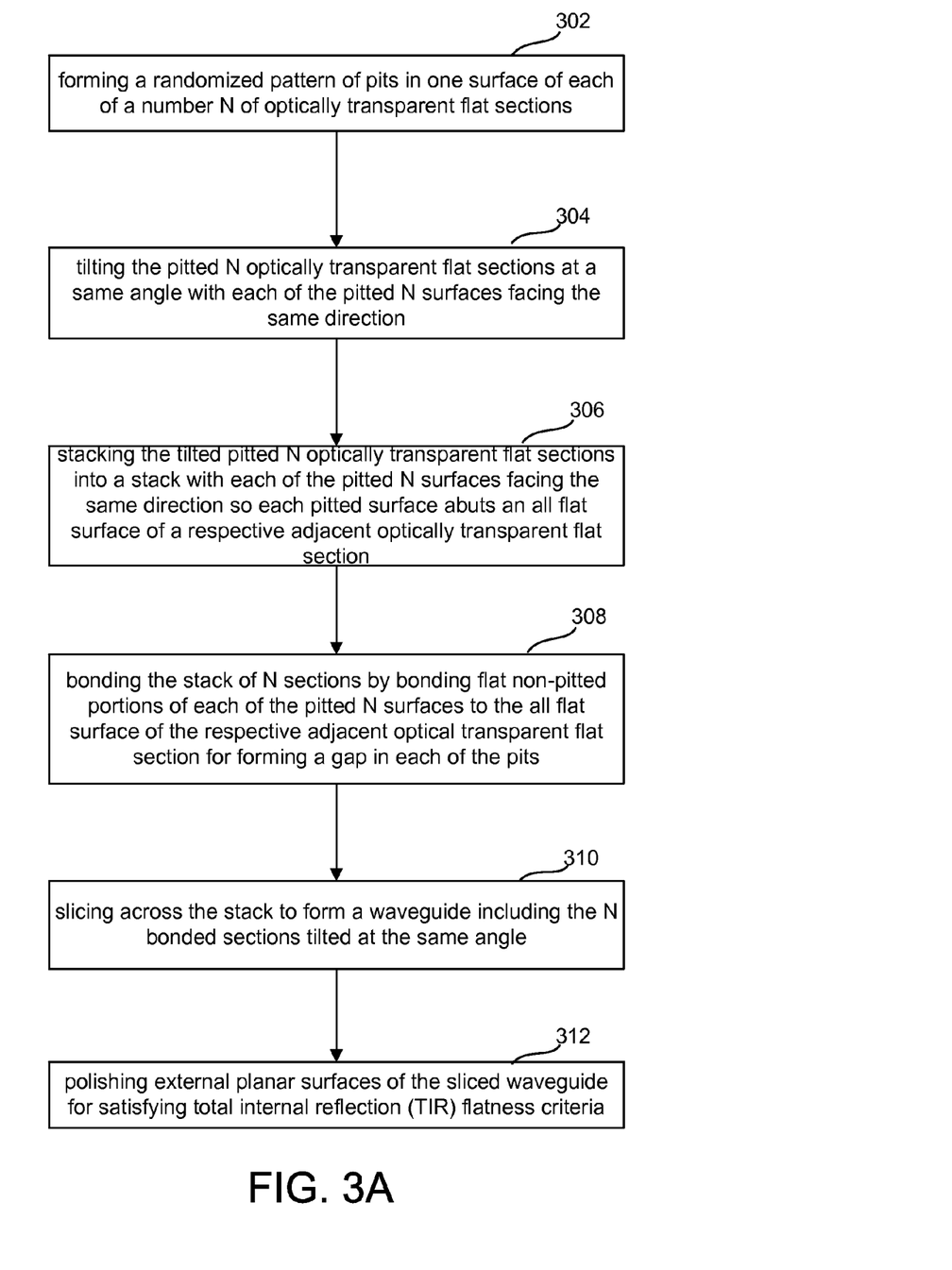
FIG. 3A is a flow chart of an embodiment of a method for making a waveguide using gaps for turning light.

FIG. 3A is a flow chart of an embodiment of a method for making a waveguide using gaps for turning light. In step 302, a pseudo-randomized pattern of pits is formed in one surface of each of a number N of optically transparent flat sections. For example, contact impression, or milling techniques may be used. Contact impression involves pressure molding against a template. In some embodiments, milling may be plasmaionic or electrochemical milling where a patter is transferred by etching with an electrical ion. In step 304, the pitted N optically transparent flat sections are tilted at a same angle with each of the pitted N surfaces facing in the same direction, and in step 306, the tilted pitted N optically transparent flat sections are stacked with each of the pitted N surfaces facing in the same direction so each pitted surface abuts an all flat surface of a respective adjacent optically transparent flat section. In step 308, the N sections are bonded by bonding flat non-pitted portions of each of the pitted N surfaces to the all flat surface of the respective adjacent optical transparent flat section for forming a gap in each of the pits. In step 310, the external planar surfaces of the bonded N sections are polished for satisfying total internal reflection (TIR) flatness criteria.

Figure 3B:
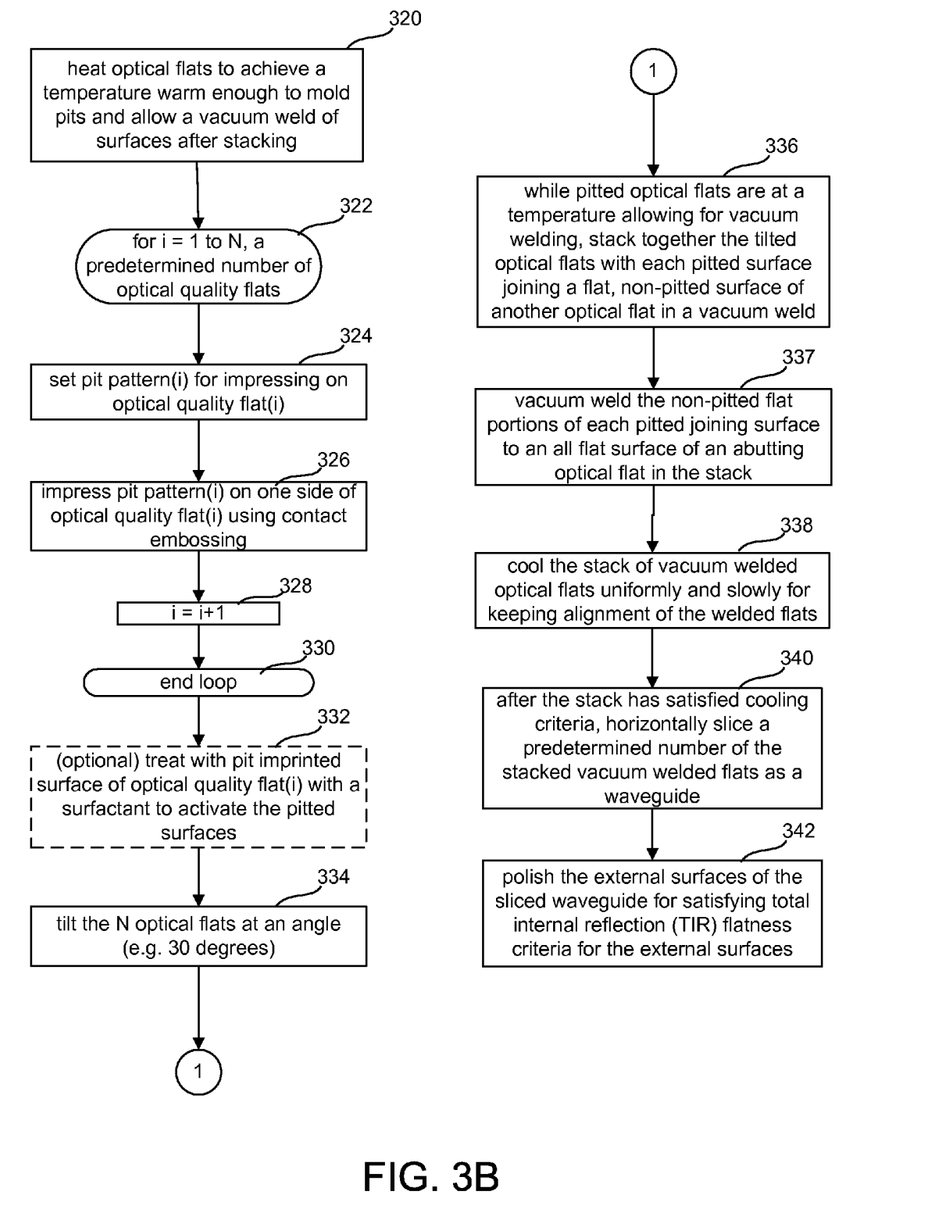
FIG. 3B is a flow chart of a more detailed example of a method for making a waveguide using gaps for turning light.
Figure 3C:
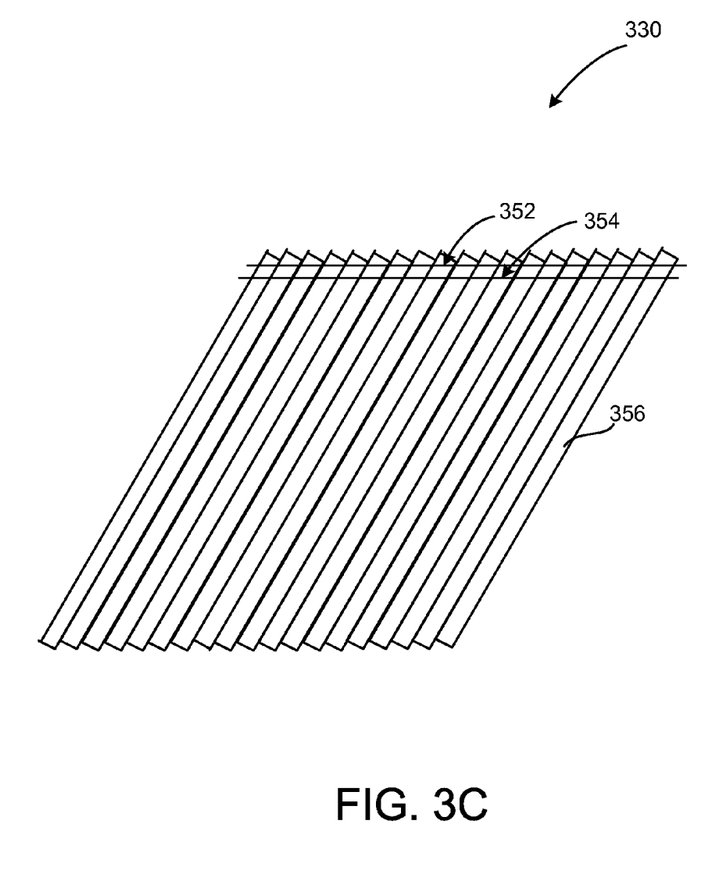
FIG. 3C is a block diagram illustrating a slicing step in an embodiment of a method for making a waveguide using gaps for turning light.

FIG. 3B is a flow chart of a more detailed example of a method for making a waveguide using gaps for turning light. The method embodiment may be performed in a vacuum environment for vacuum filled gaps or in a clean, unreactive gas such as nitrogen. Steps 322, 324 and 326 provide an example way of impressing pits onto one side of optically transparent sections, which in this example are optical-quality flats. FIG. 3C illustrates examples of optical quality flats 356. Only one flat is labeled to avoid overcrowding the drawing. For vacuum welding later, in step 320, the optical flats are heated to achieve a temperature warm enough to mold the pits and allow a vacuum weld of the surfaces after stacking.

Etching, milling or contact embossing, a process well developed for use in the manufacture of optical disks such as DVDs, are some examples of processes which may be used to perform the impressing. In step 322, a loop counter is initialized and a limit of iterations set for N which is a predetermined number of optical quality flats being impressed. In step 324, a pit pattern (i) for the current optical quality flat (i) is set by the manufacturing machinery to impress on the current optical flat (i). In step 326, the set pit pattern (i) is impressed on one side of optical quality flat (i), for example, using contact embossing. In step 328, the loop counter iterates as per i=i+1. In step 330 designated end loop, it is determined whether this is the last flat, optical flat N. The loop continues until all N optical flats have been impressed with their individually randomized patterns.

The optical flats 356 may have been produced with clean surfaces which can be bonded. Or optionally, in step 332, the pit imprinted surfaces of the optical quality flats may be treated with a surfactant to activate the pitted surfaces. Throughout the process before the cooling step, the optical flats may be maintained at a temperature allowing for vacuum welding. In other examples, the flats may be heated again to such temperature when ready for the stacking step.

In step 334, the N optical flats are tilted at an angle, preferably 30 degrees from a normal. In step 336, while the pitted optical flats are at a temperature allowing for vacuum welding, the tilted optical flats 356 are stacked. FIG. 3C illustrates an example of the stacked optical flats. In step 337, the non-pitted flat portions of each pitted joining surface is vacuum welded to an all flat surface of an abutting optical flat in the stack. The surfaces being vacuum welded are typically very clean. In step 338, the stack of vacuum welded optical flats is cooled uniformly and slowly for keeping alignment of the welded flats. Vacuum welding is clean, transparent, strong, and durable.

Figure 3D:
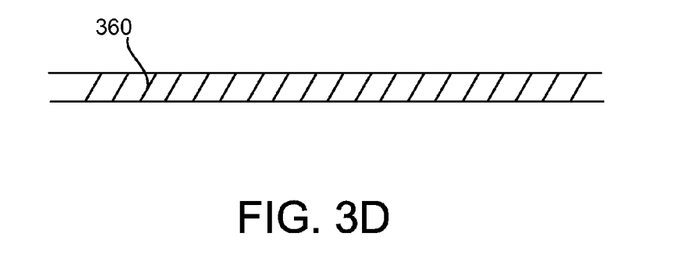
FIG. 3D is a block diagram of a side view of a waveguide resulting from the slicing step of FIG. 3B.

In step 340, after the stack has satisfied cooling criteria to allow for slicing, for example with saws, a predetermined number of the stacked vacuum welded flats are horizontally sliced to be a waveguide such as that illustrated in FIG. 3D. In step 342, the external planar surfaces of the sliced waveguide are polished for satisfying total internal reflection (TIR) flatness criteria for the external surfaces. An example of such criteria is mirror surface flatness.

FIG. 3C is a block diagram illustrating a slicing step in an embodiment of a method for making a waveguide using gaps for turning light. Lines 352 and 354 illustrate slice lines across the N pitted, tilted, stacked and bonded, via vacuum welding, optical flats 356. FIG. 3D is a block diagram of a display side view of a waveguide from which image light is directed toward a viewer resulting from the slicing step of FIG. 3C. In this example, each joining surface has a same uniform overall surface area which includes its pitted and non-pitted sections. Just one pitted joining surface 360 is labeled to avoid overcrowding the drawing.

A resulting waveguide may have a thickness of several millimeters (mm) for a small display. For a near-eye display, the waveguide may have a thickness of just a couple of millimeters in a depth direction from the viewer's eye. However, the waveguide may be made at different sizes. At a large size for television sized panels that show what seems to be a distant image, a waveguide of a centimeter to a few centimeters thickness may be used.

As illustrated in FIG. 3C, the joins would be stacked fairly close, may be half (½) the separation as compared to the waveguide thickness. This ensures that the observer sees a smooth contribution from multiple pitted joining surfaces. In one example, a waveguide had 40 pitted joining surfaces.

Figure 4A:
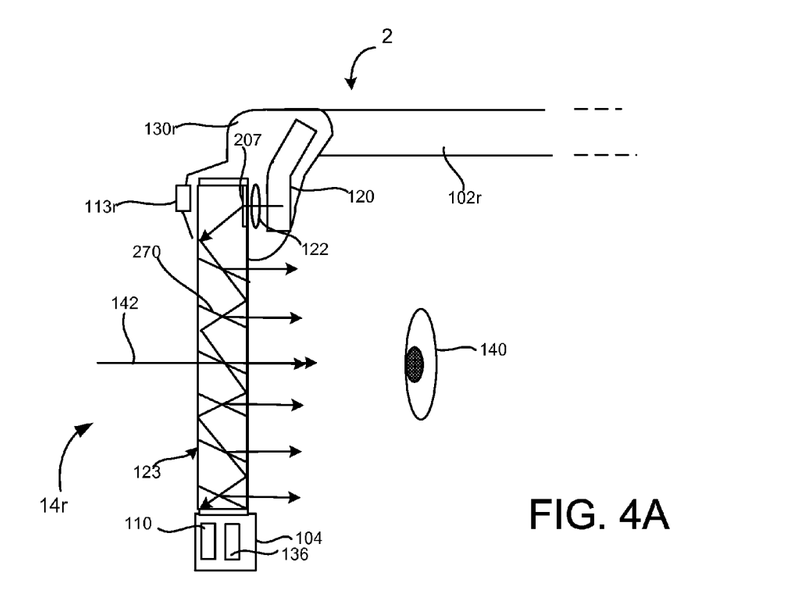
FIG. 4A is a top view of an embodiment of a near-eye display (NED) including an embodiment of a waveguide using gaps which is optically coupled with an image generation unit in a NED system.

FIG. 4A is a top view of an embodiment of a near-eye display (NED) 14r including an embodiment of a waveguide 123 using gaps which is optically coupled with an image generation unit 120 in a NED device 2. A representative tilted pitted joining surface 270 is labeled within the waveguide 123. The near-eye display is in an eyeglasses form factor. In order to show the components of the display optical system 14, in this case 14r for the right eye, a portion of a top frame section covering the display 14r and the image generation unit 120 is not depicted. Arrow 142 represents an optical axis of the display optical system 141. Eye space 140 approximates a location of a user's eye when the device 2 is worn.

In this embodiment, the displays 14r is an optical see-through displays, but in other embodiments, it can be a video-see display. The display 14r includes a waveguide 123 including gapped planes like the pitted joining surfaces 270. Just one joining surface is labeled to avoid overcrowding the drawing. Input window 207 receives collimated image light from the image generation unit 120 via optically coupling collimating lens 122. The waveguide 123 directs the received image light towards the user eye space 140 while also allowing light from the real world to pass through towards the user's eye space, thereby allowing the user to have an actual direct view of the space in front of NED device 2 in addition to seeing an image of a virtual feature from the image generation unit 120.

In the illustrated embodiment, the image generation unit 120 is in a right side housing 130r which also supports an outward facing camera 113r which collects image data of the scene in front of the user. The housing 130r is also supported by a temple arm 102r of the eyeglasses. The image generation unit 120 includes one or more LEDs, and a microdisplay which produces the image light. Nose bridge 104 in this embodiment supports a microphone 110 and control circuitry 136. Electrical connections (not shown) are provided within the frame of the eyeglasses.

Figure 4B:
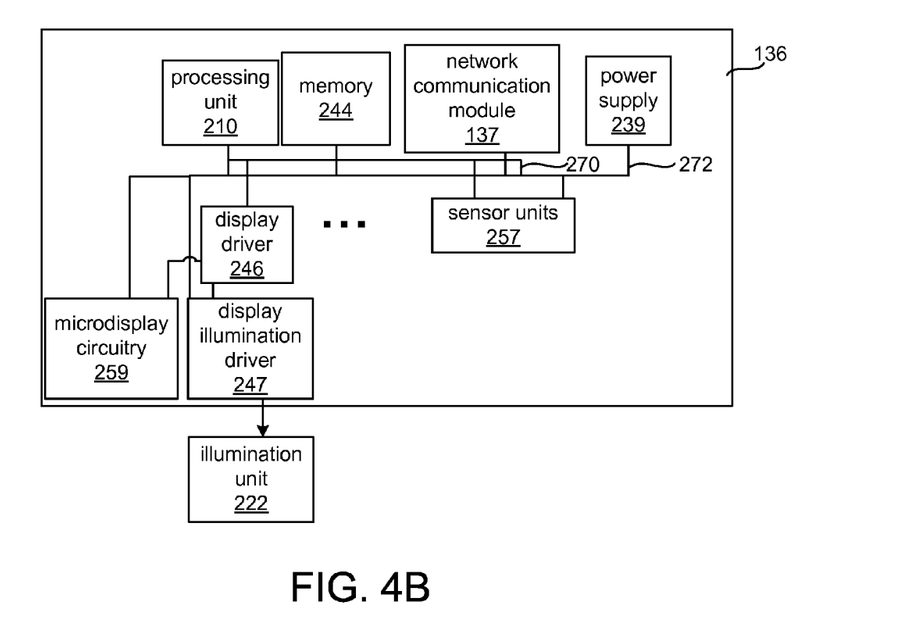
FIG. 4B is a block diagram of example hardware components including a computer system within control circuitry of a NED device.

FIG. 5B is a block diagram of example hardware components including a computer system within control circuitry of a NED device. Control circuitry 136 provides various electronics that support the other components of head mounted, near-eye display device 2. In this example, the control circuitry 136 for the display device 2 comprises a processing unit 210, a memory 244 accessible to the processing unit 210 for storing processor readable instructions and data, a communication module 137 communicatively coupled to the processing unit 210 which can act as a network interface for connecting the NED device to another computer system. A power supply 239 provides power for the components of the control circuitry 136 and the other components of the display device 2 like the capture devices 113, the microphone 110, other sensor units, and for power drawing components for displaying image data on the display 14 such as light sources and electronic circuitry associated with an image generation unit like a microdisplay and an illumination unit 222 in the image generation unit 120.

The processing unit 210 may comprise one or more processors including a central processing unit (CPU) and a graphics processing unit (GPU). Memory 244 is representative of the various types of memory which may be used by the system such as random access memory (RAM) for application use during execution, buffers for sensor data including captured image data and display data, read only memory (ROM) or Flash for instructions and system data, and other types of nonvolatile memory for storing other items, some examples of which are applications for which image light representing image data is generated. In this example, an electrical connection of a data bus 270 connects the sensor units 257, the display driver 246, processing unit 210, memory 244, and the communication module 137. The data bus 270 also derives power from the power supply 239 through a power bus 272 to which all the illustrated elements of the control circuitry are connected for drawing power.

The control circuitry further comprises a display driver 246 for selecting digital control data, e.g. control bits, to represent image data which digital control data may be decoded by microdisplay circuitry 259 and different active component drivers of the image generation unit 120 like an illumination unit 122. An example of an active component driver is a display illumination driver 247 which converts digital control data to analog signals for driving an illumination unit 222 which includes one or more light sources like one or more light emitting diodes (LEDs). Corrections to be applied to source pixels such as corrections for adjusting the color and brightness changes measured for image data in different zones of the waveguide 123 may compensating multipliers of pixel intensity for gradation of illumination can be stored in memory 244 and applied by the display illumination driver 247 under control of the control circuitry 136 having access to memory 244.

The control circuitry 136 may include other control units not illustrated here but related to other functions of a NED device such as providing audio output, identifying head orientation and location information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A waveguide including gaps for turning light comprising:
    planar surfaces extending a length of the waveguide including a top planar surface;
    a plurality of gapped planes located within the waveguide surrounded by the planar surfaces, each gapped plane meeting the top planar surface tilted at a same angle;
    each gapped plane includes a group of gaps occupying a fraction of an area of the respective plane; and
    each of the gapped planes partially reflects out of the waveguide light received within a first angle range and transmits down the waveguide light received within a second angle range.

2. The waveguide of claim 1 wherein the same angle is thirty (30) degrees from a normal plane to the top surface.

3. The waveguide of claim 1 wherein the gaps are filled with at least one of vacuum, air or gas.

4. The waveguide of claim 1 wherein the gaps have parallel sides tilted at the same angle and are a quarter wavelength in thickness.

5. The waveguide guide of claim 1 wherein each group of gaps has a pseudo-randomized pattern.

6. A optically transparent waveguide comprising:
    planar surfaces including a top planar surface and a bottom planar surface;
    joining surfaces, each joining surface having flat surface areas and a number of gaps and extending from the top planar surface to the bottom planar surface;
    each joining surface is tilted at a same angle with respect to the top planar surface;
    each gap of each joining surface reflecting out of the waveguide light received by the gap within a first angle range; and
    each gap of each joining surface passing for total internal reflection down the waveguide light received within a second angle range.

7. The waveguide of claim 6 wherein the same angle at which each joining surface is tilted with respect to the top planar surface is thirty (30) degrees with respect to a plane normal to the top planar surface.

8. The optically transparent waveguide of claim 6 further comprising:

each joining surface has a percentage of surface area occupied by the respective number of gaps, and a fraction of light received by the respective joining surface within the first angle range which is reflected out of the waveguide by the respective joining surface is determined based on the percentage of surface area occupied by the respective number of gaps.

9. The waveguide of claim 6 wherein each gap in a joining surface is formed by a respective pit in the joining surface and an adjacent all flat surface bonded to the flat surface areas of the joining surface.

10. The waveguide of claim 9 wherein the adjacent all flat surface bonded to the flat surface areas of the joining surface are vacuum welded and each of the gaps are filled with vacuum.

11. The waveguide of claim 6 wherein each of the gaps is filled with air.

12. The waveguide of claim 6 wherein each of the gaps is filled with a gas.

13. The waveguide of claim 6 wherein the gaps are about a quarter wavelength in thickness.

14. The waveguide of claim 8 wherein the percentage of the surface area of the respective partially output reflective joining surface occupied by the respective number of gaps is based on an inverse of a number of joining surfaces traversed by light prior to reaching the respective joining surface.

15. The waveguide of claim 6 further comprising the gaps of each joining surface are positioned in a pseudo-randomized pattern, and each joining surface has a different pseudo-randomized pattern of gaps.

16. The waveguide of claim 6 further comprising each of the gaps has a circular edge boundary in the surface of the joining surface.

17. A method of making a waveguide using gaps for turning light comprising:
    forming a pseudo-randomized pattern of pits in one surface of each of a number N of optically transparent flat sections;
    tilting the pitted N optically transparent flat sections at a same angle with each of the pitted N surfaces facing in the same direction;
    stacking the tilted pitted N optically transparent flat sections into a stack with each of the pitted N surfaces facing the in the same direction so each pitted surface abuts an all flat surface of a respective adjacent optically transparent flat section;
    bonding the stack of N sections by bonding flat non-pitted portions of each of the pitted N surfaces to the all flat surface of the respective adjacent optical transparent flat section for forming a gap in each of the pits;
    slicing across the stack to form a waveguide including the N bonded sections tilted at the same angle, and
    polishing external planar surfaces of the sliced waveguide for satisfying total internal reflection (TIR) flatness criteria.

18. The method of claim 17 wherein bonding flat non-pitted portions of each of the pitted N surfaces to the all flat surface of the respective adjacent optical transparent flat section further comprises
    vacuum welding the flat non-pitted portions of each of the pitted N surfaces to the all flat surface of the respective adjacent optical transparent flat section.

19. The method of claim 17 wherein forming a pseudo-randomized pattern of pits in one surface of each of a predetermined number N of optically transparent flat sections further comprises
    impressing the randomized pattern of pits in the one surface of each of the predetermined number N of optically transparent flat sections using at least one of contact embossing, milling or etching.

20. The method of claim 17 wherein the waveguide is made of an optically transparent material including at least one of plastic, glass or quartz.

* * * * *